C. A. CLAYTON.
TAPPET FOR SPRAYERS.
APPLICATION FILED JUNE 29, 1912.

1,175,341. Patented Mar. 14, 1916.

Witnesses
J. Milton Jester
E. Everett

Inventor
C. A. Clayton
D. A. Gourick
Attorney

UNITED STATES PATENT OFFICE.

CHARLES ABNER CLAYTON, OF SWEETWATER, TEXAS.

TAPPET FOR SPRAYERS.

1,175,341.    Specification of Letters Patent.    Patented Mar. 14, 1916.

Application filed June 29, 1912. Serial No. 706,687.

*To all whom it may concern:*

Be it known that I, CHARLES ABNER CLAYTON, a citizen of the United States, residing at Sweetwater, in the county of Nolan and State of Texas, have invented certain new and useful Improvements in Tappets for Sprayers, of which the following is a specification.

My invention relates to sprayers, and particularly to a spraying device which may be attached to a cultivator or other wheeled implement. Sprayers of this class commonly comprise a tank for the storage of a liquid desired to be sprayed onto plants, a pump, and a series of spray nozzles connected with the tank.

The object of my invention is to provide a device of this character which is easily and quickly applied to a cultivator frame, and which is operated by the movement of the cultivator wheels.

An important object is the provision of novel means for operating the pump.

A further object is to provide means for regulating the amount of liquid supplied to the nozzles, and also the pressure of the air.

Another object is to provide a device of this character which will be simple and efficient in operation, cheap to manufacture, and durable in service.

With these and other objects and advantages in view, my invention consists in the novel arrangement and combination of parts as hereinafter described and claimed.

Figure 1:
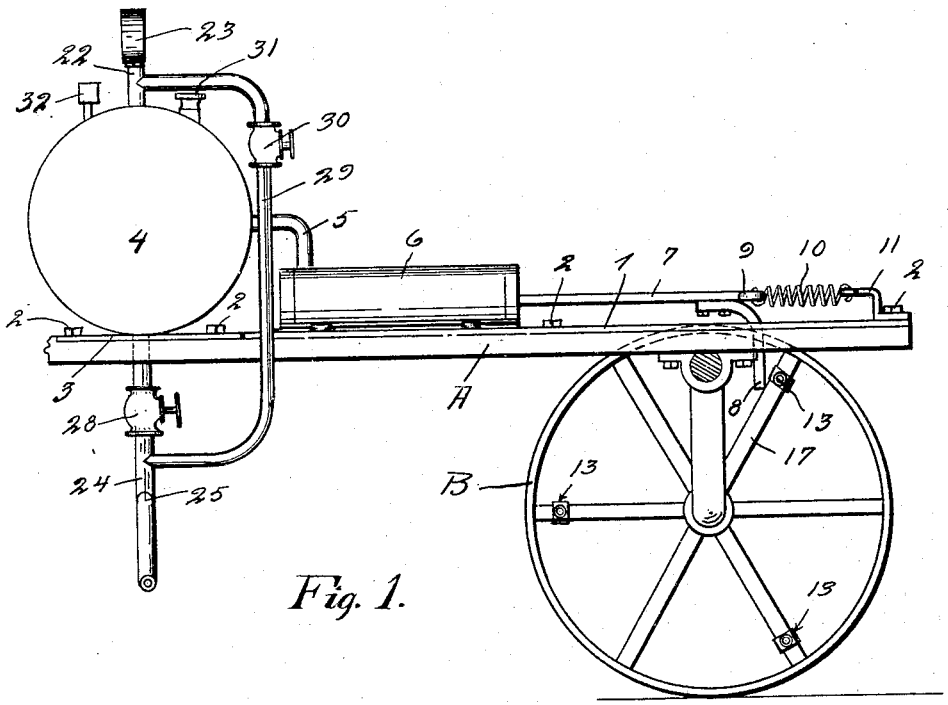
Figure 2:
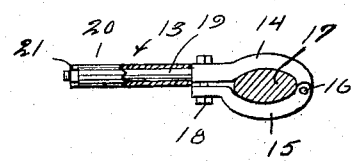

Referring to the drawings wherein is illustrated the preferred embodiment of my invention, Figure 1 is a side elevation of my device applied to a cultivator, one wheel being removed, Fig. 2 is a detail view of the tappet attached to one of the spokes.

Referring more particularly to the drawings, A represents a cultivator frame supported upon wheels B.

My device comprises a base plate 1 secured upon the frame A, preferably by bolts 2. The forward end of the plate 1 is provided with a lateral extension 3 upon which is mounted a storage tank or reservoir 4. I have shown the tank as being of cylindrical form, but do not limit myself in this particular.

A pipe 5 connects the tank 4 with a pump casing 6 mounted upon the base plate 1. This pump is of the common force-pump type, and needs no detailed description. The piston rod 7 is provided with a depending portion 8, for a purpose to be described, and an eye 9 for engagement with one end of a retractile coil spring 10 which is secured to a bracket 11 upon the plate 1.

The depending portion 8 of the piston 7 extends through a slot 12 in the plate 1, and is disposed in the path of travel of tappet levers 13 secured to one of the wheels B. These tappets comprise clamping plates 14 and 15 pivoted to each other as at 16, and adapted to receive the spoke 17 in the wheel B. A bolt 18 passes through the plates 14 and 15 and clamps the device securely upon the spoke. Connected with the plate 14, or preferably formed integrally therewith, is an extending member 19, upon which is journaled a roller 20, held in place by a nut 21 upon the member 19.

It will be seen that as the wheel revolves, the tappets 13 will successively engage the depending portion 8, and operate the piston in one direction. When the wheel has revolved sufficiently to release the portion 8, the piston is moved in the opposite direction by the spring 10. It will also be seen that by moving the tappets along the spoke toward the hub of the wheel the length of the stroke of the pump may be shortened, and vice versa.

Communicating with the tank 4 is a pipe 22 connected with a pressure gage 23. Another pipe 24 communicates with the lower part of the tank and is connected with laterally extending pipes 25, provided with branches 26 terminating in spray nozzles 27. The pipe 24 is provided with a valve 28 for regulating the amount of liquid supplied to the nozzles. Pipes 22 and 24 are connected by a pipe 29 provided with a valve 30. By regulating the valve 28 the amount of liquid supplied to the sprayer nozzles may be varied as desired. The amount of air passing out with the liquid to the sprayers is varied also by means of the valve 30. It will be observed that by opening the valve 30 an atomizing effect is produced. The tank 4 is provided with an opening for filling closed by a screw cap 31.

The numeral 32 designates a safety valve of any well known or preferred type.

I have shown my device as being operated by three tappets, though I do not wish to limit myself in this particular, for I may provide as many spokes as desired with tappets in order to increase the speed of the pump.

It will be understood that various changes in the form, construction and arrangement of parts may be resorted to without departing from the spirit of my invention or limiting the scope of the subjoined claim.

Having thus described my invention what I claim is:

A tappet adapted to be clamped upon one of the wheels of a spraying device comprising a body portion, a projecting spindle, a roller journaled on said spindle, a clamping portion hinged at one end upon said body portion, and a bolt for connecting the other end of said clamping portion with said body portion.

In testimony whereof I hereto affix my signature in the presence of two witnesses.

CHARLES ABNER CLAYTON.

Witnesses:
B. W. KIERAN,
W. P. CURTIS.

Copies of this patent may be obtained for five cents each, by addressing the "Commissioner of Patents, Washington, D. C."